United States Patent
Shanmugam

(10) Patent No.: US 10,402,787 B2
(45) Date of Patent: Sep. 3, 2019

(54) RESOURCE SHARING PLATFORM

(71) Applicant: Xpolinate, Inc., Woodland Hills, CA (US)

(72) Inventor: Vijay Suresh Shanmugam, Woodland Hills, CA (US)

(*) Notice: Subject to any disclaimer, the term of this patent is extended or adjusted under 35 U.S.C. 154(b) by 360 days.

(21) Appl. No.: 15/205,499

(22) Filed: Jul. 8, 2016

(65) Prior Publication Data

US 2018/0012185 A1 Jan. 11, 2018

(51) Int. Cl.
| | |
|---|---|
| *G06Q 10/10* | (2012.01) |
| *G06Q 10/06* | (2012.01) |
| *G06Q 10/00* | (2012.01) |
| *G06Q 30/08* | (2012.01) |
| *G06Q 30/02* | (2012.01) |
| *G06Q 50/00* | (2012.01) |

(52) U.S. Cl.
CPC ....... *G06Q 10/1053* (2013.01); *G06Q 10/105* (2013.01); *G06Q 50/01* (2013.01)

(58) Field of Classification Search
CPC ... G06Q 10/105; G06Q 10/1053; G06Q 50/01
USPC .......................... 705/1.1–912, 319, 320, 321
See application file for complete search history.

(56) References Cited

U.S. PATENT DOCUMENTS

| | | | | |
|---|---|---|---|---|
| 6,385,620 B1* | 5/2002 | Kurzius | ................ | G06Q 10/10 |
| 2005/0021750 A1* | 1/2005 | Abrams | ................ | G06Q 10/10 |
| | | | | 709/225 |
| 2006/0085480 A1* | 4/2006 | Veronesi | ................ | G06Q 10/10 |
| 2006/0229896 A1* | 10/2006 | Rosen | ................ | G06Q 10/10 |
| | | | | 705/321 |
| 2009/0258334 A1* | 10/2009 | Pyne | ................ | G06Q 10/06 |
| | | | | 434/236 |
| 2011/0055041 A1* | 3/2011 | Shaw | ................ | G06Q 10/06 |
| | | | | 705/26.3 |
| 2013/0166340 A1* | 6/2013 | Salame | ................ | G06Q 10/06 |
| | | | | 705/7.14 |
| 2014/0180749 A1* | 6/2014 | Woodward | ....... | G06Q 10/06314 |
| | | | | 705/7.24 |
| 2014/0207508 A1* | 7/2014 | Faulkner | ........ | G06Q 10/063116 |
| | | | | 705/7.16 |
| 2018/0012171 A1* | 1/2018 | Massabki | ....... | G06Q 10/063112 |

OTHER PUBLICATIONS

International Search Report and Written Opinion received in PCT/US2017/41338, dated Jan. 5, 2018 (7 pages).

* cited by examiner

*Primary Examiner* — Jonathan P Ouellette
(74) *Attorney, Agent, or Firm* — Redbrick IP, P.C.

(57) ABSTRACT

A system and method for providing a resource sharing platform, including storing in a talent registry talents of a user and conditions under which the user may share the talents; storing in an organization registry needs of an organization and conditions pertaining to a fulfillment of the needs by a potential resource sharing match involving the user and the organization; generating a talent interface on a client device of the user that enables the user to discover the needs and the conditions of the organization; generating an organization interface on a client device of the organization that enables the organization to discover the talents and the conditions of the user; and obtaining an approval of the potential resource sharing match involving the user and the organization in response to match conditions specified by a home organization of the user.

19 Claims, 12 Drawing Sheets

RESOURCE SHARING PLATFORM

BACKGROUND

An organization (e.g., a corporation, business, government entity, educational or other institution, etc.) can employ individuals having a variety of skills according to the activities of the organization. For example, a medical device maker can employ medical doctors, research scientists, engineers, marketers, sales people, accountants, administrators, laborers, etc., that enable the medical device maker to undertake its activities of designing, making, and selling medical devices.

An organization can recruit individuals with desired skills by posting jobs online. Individuals can search the posted jobs and submit their qualifications online. Likewise, individuals can post their qualifications online and organizations can search the posted qualifications.

SUMMARY

In general, in one aspect, embodiments relate to methods and systems for resource sharing. A resource sharing platform can include: a talent registry for storing a set of talents of a user and a set of conditions under which the user is willing to share the talents; an organization registry for storing a set of needs of an organization and a set of conditions pertaining to a fulfillment of the needs by a potential resource sharing match involving the user and the organization; a talent interface module executing on the computer processor and configured to enable the computer processor to generate a talent interface on a client device of the user, the talent interface enabling the user to specify the talents and the conditions of the user and enabling the user to discover the needs and the conditions of the organization; an organization interface module executing on the computer processor and configured to enable the computer processor to generate an organization interface on a client device of the organization, the organization interface enabling the organization to specify the needs and the conditions of the organization and enabling the organization to discover the talents and the conditions of the user; and a collaboration module executing on the computer processor and configured to enable the computer processor to obtain an approval of the potential resource sharing match involving the user and the organization in response to a set of match conditions for the resource sharing match specified by a home organization of the user.

In general, in one aspect, embodiments relate to a non-transitory computer-readable storage medium having instructions for resource sharing. The instructions are configured to execute on at least one computer processor to enable the computer processor to: store in a talent registry a set of talents of a user and a set of conditions under which the user will share the talents; store in an organization registry a set of needs of an organization and a set of conditions pertaining to a fulfillment of the needs by a potential resource sharing match involving the user and the organization; generate a talent interface on a client device of the user that enables the user to discover the needs and the conditions of the organization; generate an organization interface on a client device of the organization that enables the organization to discover the talents and the conditions of the user; and obtain an approval of the potential resource sharing match involving the user and the organization in response to a set of match conditions specified by a home organization of the user.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

Figure 1:
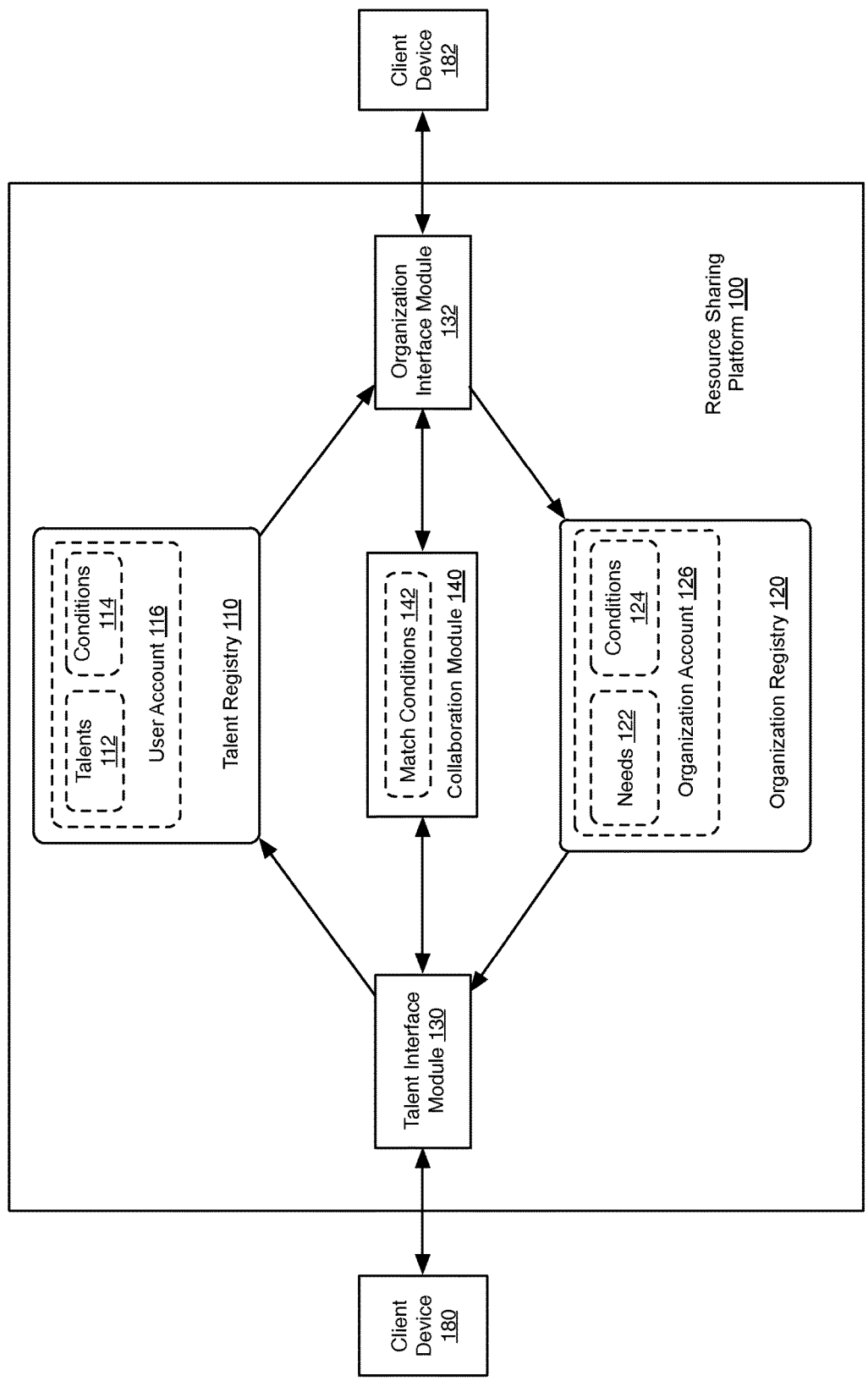
FIG. 1 shows a resource sharing platform in accordance with one or more embodiments.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the present disclosure provide a method and system for resource sharing that enables a wide variety of registered users and organizations of a resource sharing platform to advertise their talents, needs, and conditions to discover potential resource sharing matches among the users and organizations.

FIG. 1 shows a resource sharing platform in accordance with one or more embodiments. The resource sharing platform 100 includes a talent registry 110 for storing a set of talents 112 of a user associated with a user account 116 on the resource sharing platform 100, and for storing a set of conditions 114 under which the user associated with the user account 116 will share their talents 112.

The user associated with the user account 116 can be an individual who is currently associated with a particular organization, which may be referred to as their "home organization", and who seeks to broaden their career by associating with another organization, which may be referred to as an "away organization", without severing ties with their home organization. For example, the user associated with the user account 116 can be an employee, contractor, intern, volunteer, etc., of their home organization. In some embodiments, the user associated with the user account 116 can be an individual who is currently associated with a particular organization and who seeks to form an association with another user of the resource sharing platform 100, for example, to form a startup business or other type of organization.

The talents 112 can be stored in the talent registry 110 as any type or types of descriptors, parameters, tags, etc., of the talents, abilities, knowledge, experience, expertise, qualifications, etc., of the user associated with the user account 116. Examples of the talents 112 stored in the talent registry 110 can include indicators of degrees, certifications, licenses, awards, acknowledgements, etc., obtained by the user associated with the user account 116. Other examples of the talents 112 stored in the talent registry 110 can include indicators of prior work performed by the user associated with the user account 116, indicators of languages written or read by the user associated with the user account 116, diversity qualifications of the user associated with the user account 116, travel or cultural experience of the user associated with the user account 116, government or educational experience of the user associated with the user account 116, etc.

The conditions 114 indicate a set of conditions under which the user associated with the user account 116 may be willing to share their talents 112 (e.g., with an organization or organizations or other users of the resource sharing platform 100). The conditions 114 can include a set of constraints pertaining to participation by the user in a potential resource sharing match. The constraints pertaining to participation by the user in a potential resource sharing match can include a time during which the user is available to participate in a potential resource sharing match. The conditions 114 can include a description of a career enhancement the user seeks to acquire from the potential resource sharing match.

The conditions 114 can be stored in the talent registry 110 as any type or types of descriptors, parameters, tags, etc., of the conditions under which the user is willing to share their talents 112. Examples of the conditions 114 stored in the talent registry 110 include timing parameters pertaining the sharing of the talents 112 (e.g., timing parameters such as length of time, time period, cutoff dates, etc.). The timing parameters in the conditions 114 can be derived from a sabbatical arrangement of the user with their home organization. Other examples of the conditions 114 stored in the talent registry 110 include geographic parameters (e.g., preferred work locations/sites, excluded locations/sites, etc.). Still other examples of the conditions 114 stored in the talent registry 110 include indications of quid pro quo arrangements (e.g., indications of knowledge or experience or other career enhancement the user associated with the user account 116 wishes to obtain in exchange for sharing their talents 112 with one or more other users or organizations).

The resource sharing platform 100 may include an organization registry 120 for storing a set of needs 122 of an organization associated with an organization account 126, along with a set of conditions 124 pertaining to a fulfillment of the needs 122 by a potential resource sharing match involving a user of the resource sharing platform 100 and the organization. The organization can be a potential away organization for a potential resource sharing match involving the user associated with the user account 116. The organization can be a corporation, government entity, non-profit foundation, educational or other institution, partnership, sole-proprietorship, etc.

The needs 122 can be stored in the organization registry 120 as any type or types of descriptors, parameters, tags, etc., of the needs of the organization associated with the organization account 126. Examples of the needs 122 stored in the organization registry 120 can include indications of degrees, certifications, licenses, etc., belonging to an employee, contractor, volunteer, worker, etc., needed by the organization associated with the organization account 126. Other examples of the needs 122 stored in the organization registry 120 can include indicators of prior work experience, indicators of languages written or read, diversity qualifications, travel or cultural experience, government or educational experience, or areas of expertise, etc., of an employee, contractor, volunteer, worker, etc., needed by the organization associated with the organization account 126.

The conditions 124 provide a set of conditions pertaining to a fulfillment of the needs 122. The conditions 124 on the needs 122 can include a set of constraints pertaining to participation by the organization associated with the organization account 126 in a potential resource sharing match. The constraints pertaining to participation by the organization in a potential resource sharing match can include a time during which the organization is available to participate in a potential resource sharing match. The conditions 124 on the needs 122 can include a description of an organization enhancement the organization seeks to acquire from a potential resource sharing match.

The conditions 124 can be stored in the organization registry 120 as any type or types of descriptors, parameters, tags, etc., of the conditions 124 pertaining to the needs 122. Examples of the conditions 124 stored in the organization registry 120 can include timing parameters, e.g., length of time, time period, cutoff dates, etc., for employees, contractors, volunteers, joint development projects, etc., needed by the organization associated with the organization account 126. Other examples of the conditions 124 stored in the organization registry 120 include geographic parameters, e.g., required work locations/sites, preferred locations/sites, etc. Still other examples of the conditions 124 include indications of quid pro quo arrangements, e.g., indications of knowledge or experience, data, or other organization enhancement the organization associated with the organization account 126 wishes to obtain from a potential resource sharing match.

The resource sharing platform 100 may include a talent interface module 130 that generates a talent interface on a client device 180 (e.g., depicted as on a display of the client device 180) of the user associated with the user account 116. The talent interface on the client device 180 enables the user to specify their talents 112 and their conditions 114 on their talents 112 to be stored in the talent registry 110. The talent interface on the client device 180 also enables the user to discover the needs 122 and the conditions 124 stored in the organization registry 120. For example, the talent interface can enable the user of the client device 180 to enter the talents 112 and the conditions 114 via input fields, and enable the user of the client device 180 to perform a search of the contents of the organization registry 120, e.g., by generating a user interface on the client device 180 that enables a search of the organization registry 120.

The client device 180 can be a computer, laptop, mobile device, e.g., smartphone, tablet, etc. The client device 180 can communicate with the talent interface module 130 via one or more networks using web protocols or using an app running on the client device 180 that is adapted to the resource sharing platform 100.

The resource sharing platform 100 may include an organization interface module 132 that generates an organization interface on a client device 182 (e.g., depicted as on a display of the client device 182) of the organization associated with the organization account 126. The organization interface module 132 may enable a representative, official, administrator, etc., of the organization to specify the needs 122 and the conditions 124 to be stored in the organization registry 120, e.g., using input fields generated on the client device 182. The organization interface module 132 enables a representative, official, administrator, etc., of the organization to discover the talents 112 and the conditions 114 of the user associated with the user account 116, e.g., by generating a user interface on the client device 182 that enables a search of the talent registry 110.

The client device 182 can be a computer, laptop, mobile device, e.g., smartphone, tablet, etc. The client device 182 can communicate with the organization interface module 132 via one or more networks using web protocols or using an app running on the client device 182 that is adapted to the resource sharing platform 100.

The resource sharing platform 100 may include a collaboration module 140 that can obtain an approval of a potential resource sharing match involving the user associated with the user account 116 and the organization associated with the organization account 126 in response to a set of match conditions 142. The match conditions 142 indicate a set of conditions under which the home organization of the user associated with the user account 116 is willing to approve a potential resource sharing match involving the user associated with the user account 116.

The match conditions 142 can include a set of constraints under which the home organization of the user is willing to allow the user to participate in a potential resource sharing match. The constraints under which the home organization of the user is willing to allow the user to participate in a potential resource sharing match can include, for example, a duration or specific period during which the home organization is willing to allow the user to participate in the potential resource sharing match, a capacity in which the home organization is willing to allow the user to participate, and so on.

The match conditions 142 can include a description of an organization enhancement the home organization of the user seeks to acquire from a potential resource sharing match. Examples of organizational enhancements include acquisition of knowledge, data, experience, reputation, awards, contracts, expertise, etc., to the benefit of the home organization as a direct result of a resource sharing match involving the user and an away organization.

The match conditions 142 in one or more embodiments can be stored in the organization registry 120 under an account belonging to the home organization of the user. The match conditions 142 can be stored as any type or types of descriptors, parameters, tags, etc., of the match conditions. Examples of the match conditions 142 stored in the organization registry 120 include timing parameters, e.g., length of time, time period, cutoff dates, etc. The timing parameters of the match conditions 142 can be derived from organizational needs of home organization, e.g., product development cycles, sabbatical arrangements, organization policies, etc. Other examples of the match conditions 142 stored in the organization registry 120 can include geographic constraints, e.g., allowed work locations, sites, projects, technologies, etc., prohibited locations, sites, projects, technologies, etc. Still other examples of the match conditions 142 stored in the organization registry 120 can include indicators of quid pro quo arrangements, e.g., a description of knowledge, experience, technologies, information, or other organizational enhancement, etc., the corresponding home organization of the user wishes to derive from a potential resource sharing arrangement involving the user.

Figure 2:
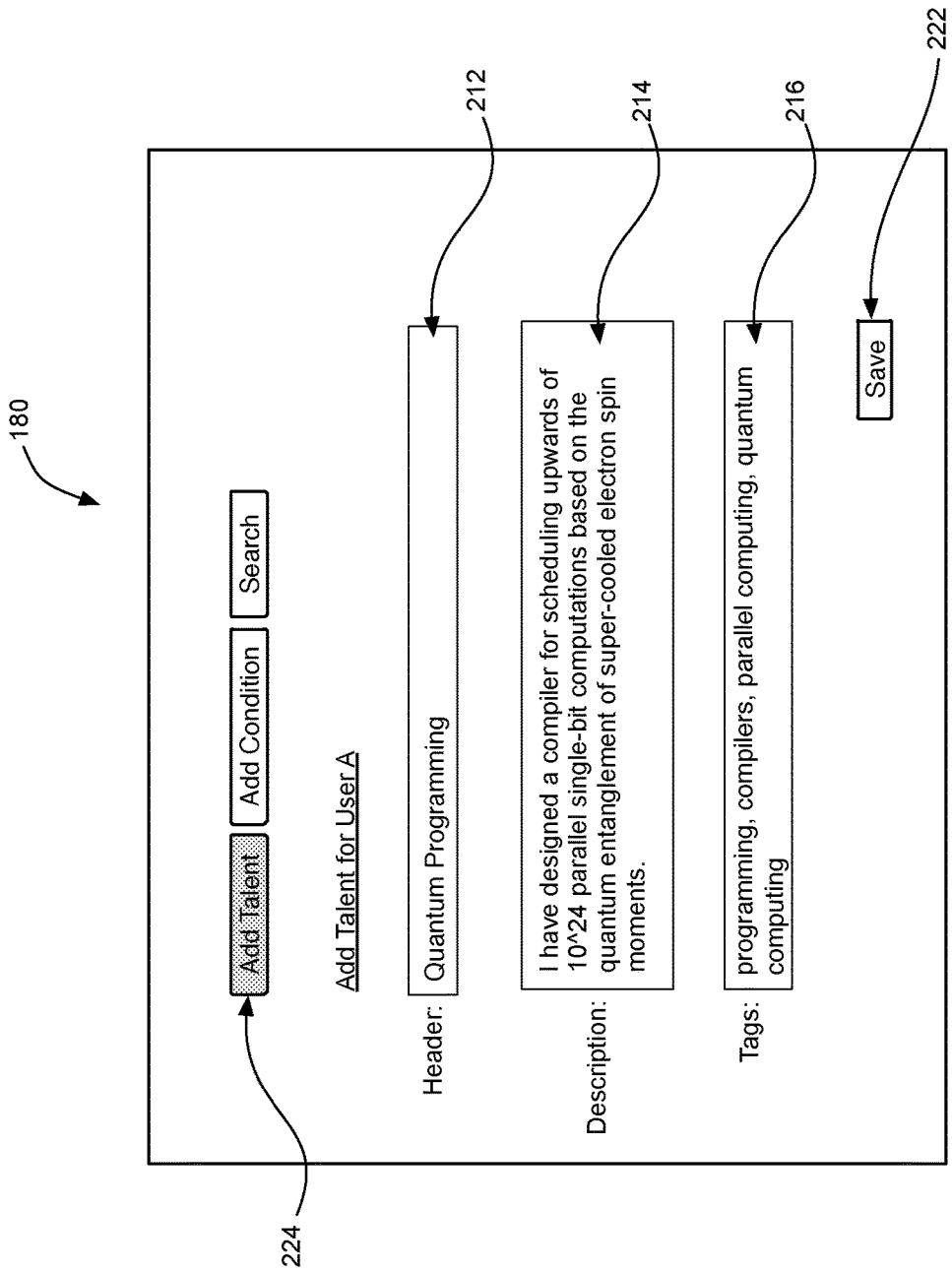
FIG. 2 shows an example of a talent interface on a client device of a resource sharing platform that enables a user to specify their talents in accordance with one or more embodiments.

FIG. 2 shows an example of a talent interface on the client device 180 that enables the user associated with the user account 116 to specify their talents 112 in accordance with one or more embodiments. In this example, the user associated with the user account 116 (e.g., User A) has selected an add talent button 224 (e.g., by touching, tapping, etc.) the add talent button 224 rendered on the client device 180.

The talent interface on the client device 180 with the add talent button 224 selected enables the User A to add a talent to their talents 112 stored in the talent registry 110. The talent interface with the add talent button 224 selected includes a header field 212 that enables User A to enter a header for a talent, a description field 214 that enables the User A to enter a description of the talent, and a tags field 216 that enables the User A to enter a set of tags separated by commas pertaining to the talent. The talent interface with the add talent button 224 selected includes a save button 222 that when selected by the User A stores the fields 212-216 with the talents 112 in the talent registry 110.

Figure 3:
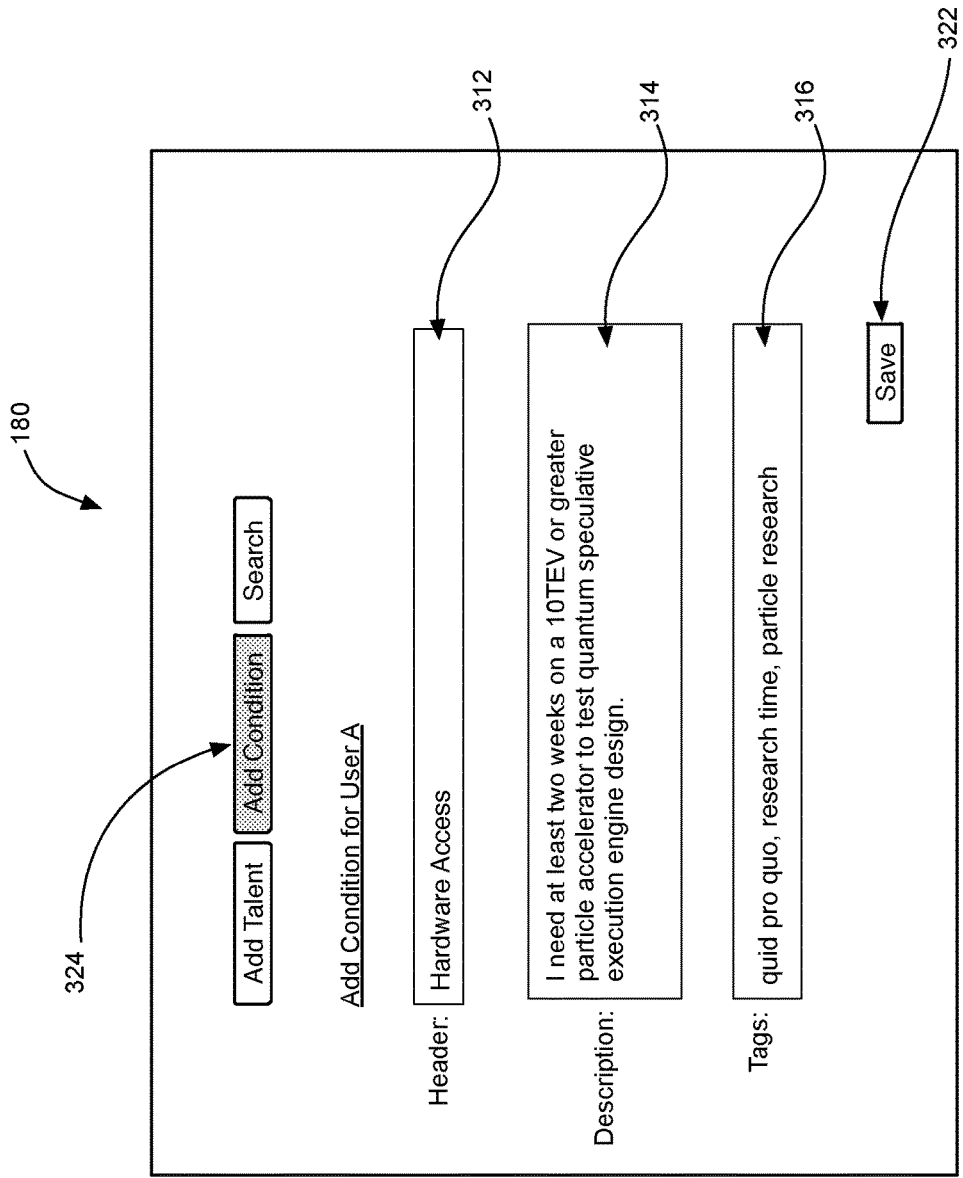
FIG. 3 shows an example of a talent interface on a client device of a resource sharing platform that enables a user to specify a set of conditions under which they are willing to share their talents in accordance with one or more embodiments.

FIG. 3 shows an example of a talent interface on the client device 180 that enables the User A to specify the conditions 114 on their talents 112 using an add condition button 324 on the client device 180 in accordance with one or more embodiments. The talent interface with the add condition button 324 selected includes a header field 312 that enables User A to enter a header for a condition, a description field 314 that enables the User A to enter a description of the condition, and a tags field 316 that enables the User A to enter a set of tags separated by commas pertaining to the condition. The talent interface with the add condition button 324 selected includes a save button 322 that when selected by the User A stores the fields 312-316 with the conditions 114 in the talent registry 110.

Figure 4:
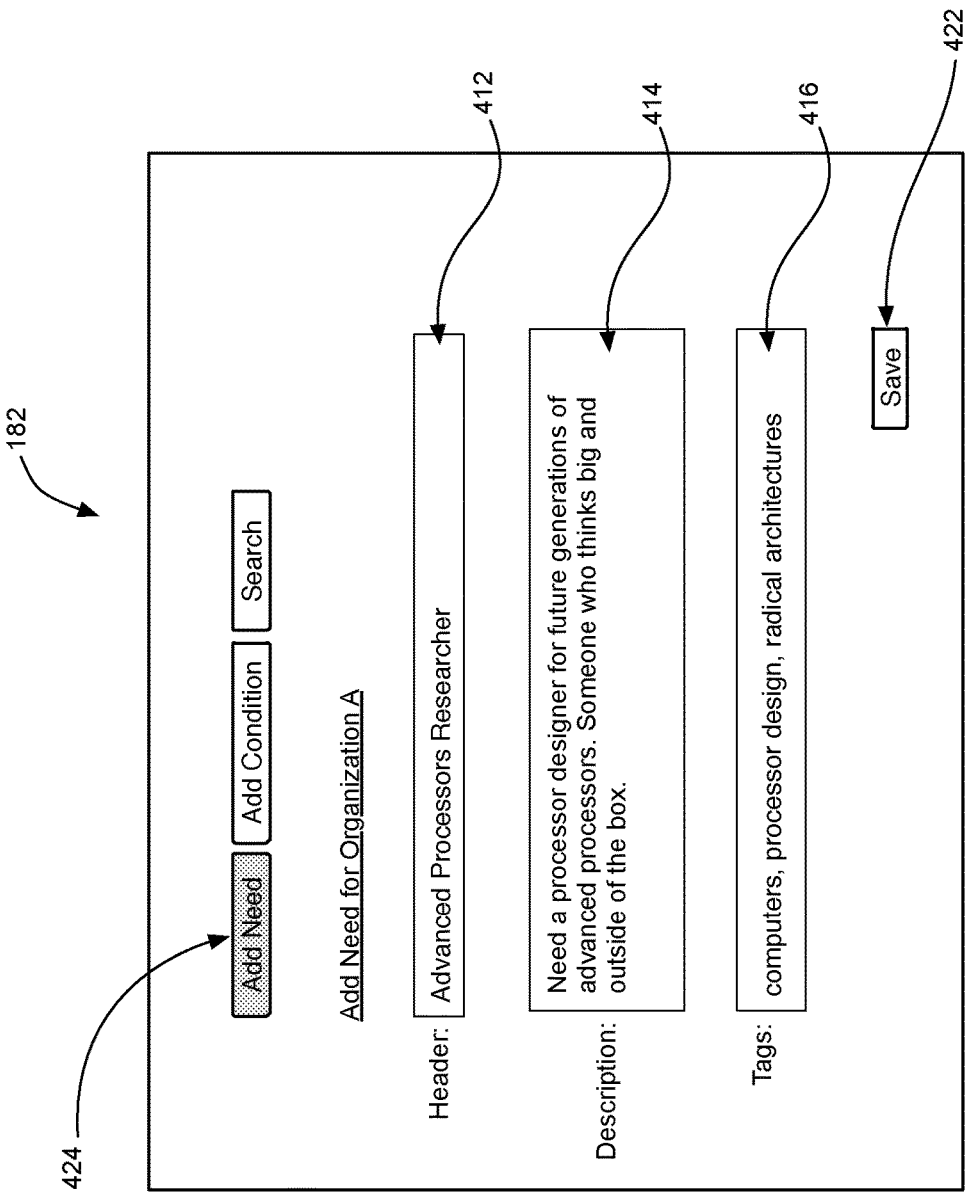
FIG. 4 shows an example of an organization interface on a client device of a resource sharing platform that enables a representative of an organization to specify a set of needs of the organization in accordance with one or more embodiments.

FIG. 4 shows an example of an organization interface on the client device 182 that enables the organization associated with an organization account 126 to specify their needs 122 in accordance with one or more embodiments. In this example, a representative, official, administrator, etc., of the organization associated with an organization account 126 (e.g., Organization A) has selected an add need button 424 on the client device 182.

The organization interface with the add need button 424 selected enables the Organization A to add a need to their needs 122 stored in the organization registry 120. The organization interface with the add need button 424 selected includes a header field 412 that enables the Organization A to enter a header for a need, a description field 414 that enables the Organization A to enter a description of the need, and a tags field 416 that enables the Organization A to enter a set of tags separated by commas pertaining to the need. The organization interface with the add need button 424 selected includes a save button 422 that when selected stores the fields 412-416 with the needs 122 in the organization registry 120.

Figure 5:
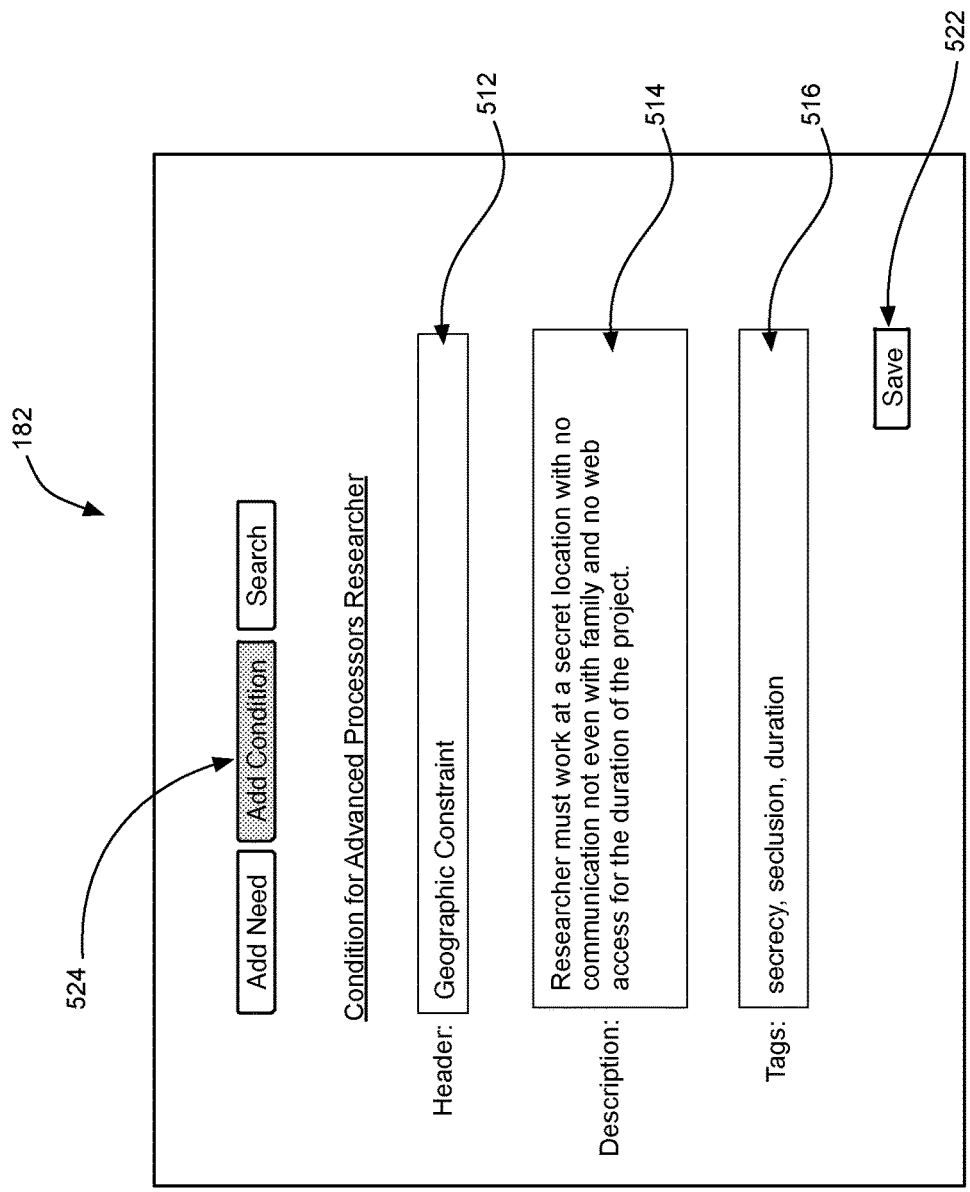
FIG. 5 shows an example of an organization interface on a client device of a resource sharing platform that enables a representative of an organization to specify a set of conditions associated with the needs of the organization in accordance with one or more embodiments.

FIG. 5 shows an example of an organization interface on the client device 182 that enables the Organization A to specify the conditions 124 associated with the needs 122 in accordance with one or more embodiments. The client device 182 with an add condition button 524 selected enables the Organization A to add a condition to their conditions 124 stored in the organization registry 120. The organization interface with the add condition button 524 selected includes a header field 512 that enables the Organization A to enter a header for a condition, a description field 514 that enables the Organization A to enter a description of the condition, and a tags field 516 that enables the Organization A to enter a set of tags separated by commas pertaining to the condition. The organization interface with the add condition button 524 selected includes a save button 522 that when selected stores the fields 512-516 with the conditions 124 in the organization registry 120.

Figure 6:
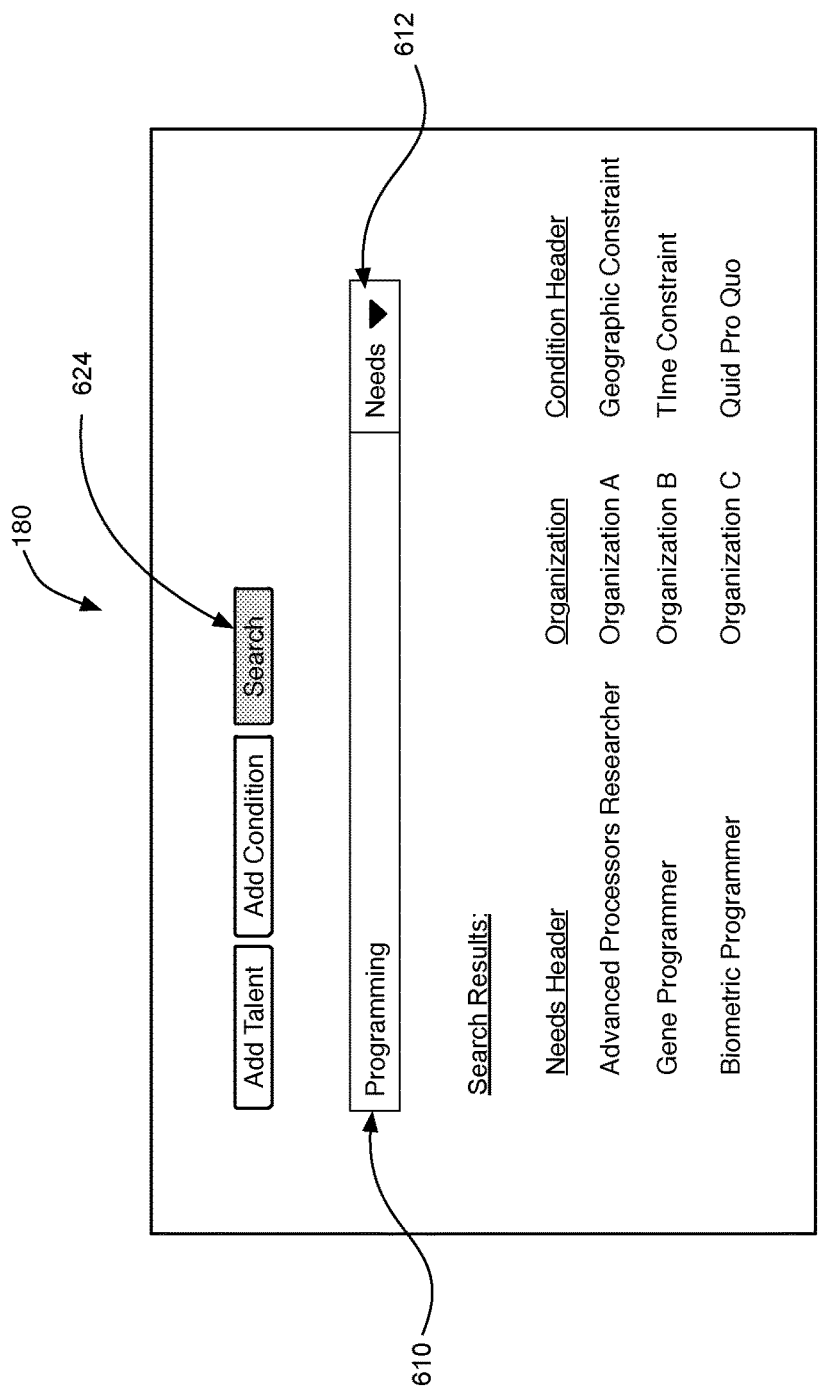
FIG. 6 shows an example of a talent interface on a client device of a resource sharing platform that enables a user to search an organization registry of the resource sharing platform in accordance with one or more embodiments.

FIG. 6 shows an example of a talent interface on the client device 180 that enables the User A to search the organization registry 120 in accordance with one or more embodiments. The talent interface with a search button 624 selected enables the User A to enter search terms into input field 610 and select a target for the search using a pull-down menu 612. In this example, the User A has selected to search the needs, including the needs 122, stored in the organization registry 120. Other areas that can be searched can include conditions on the needs, including the conditions 124, tags of the needs, tags of the conditions, organization profiles stored in the organization registry 120, etc.

Figure 7:
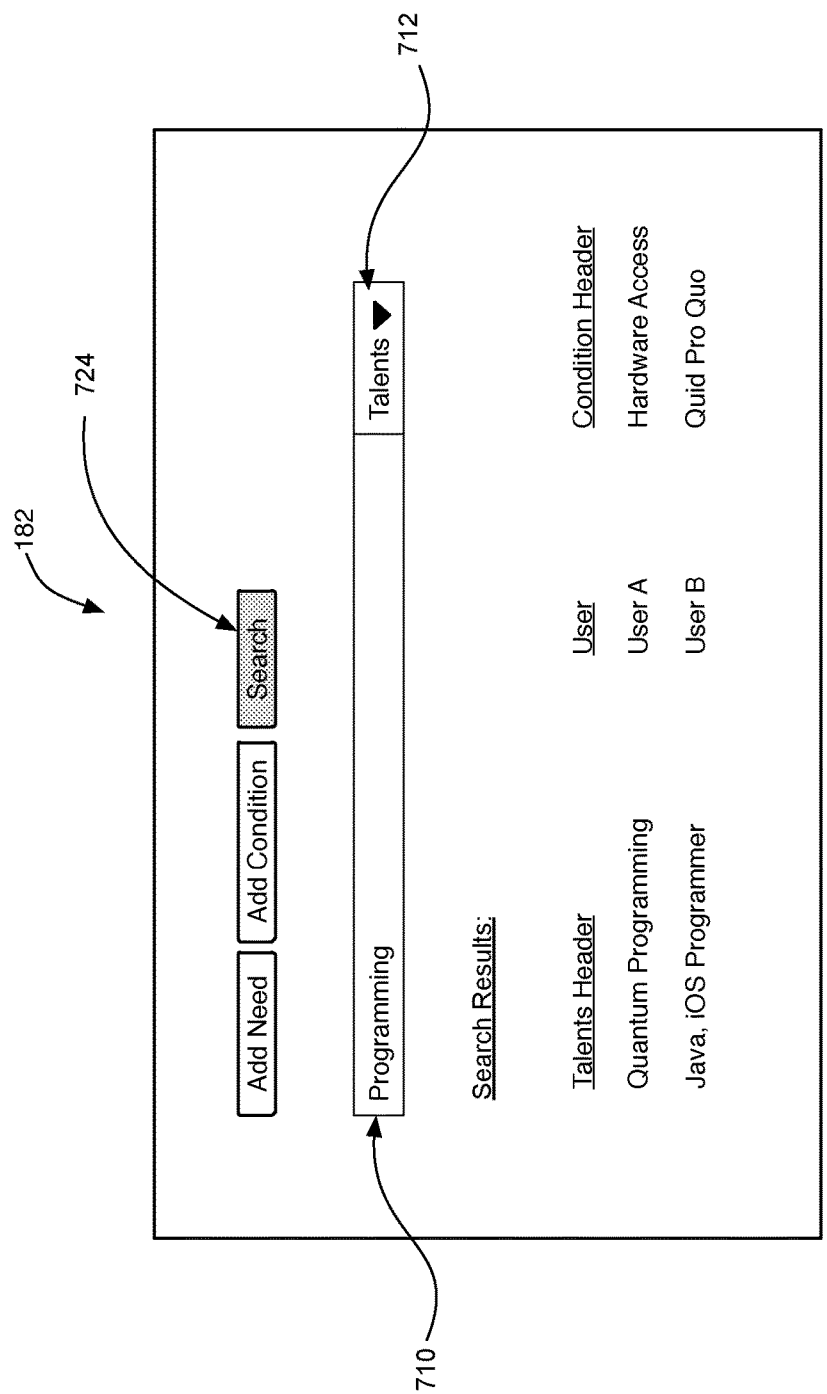
FIG. 7 shows an example of an organization interface on a client device of a resource sharing platform that enables a representative of an organization to search a talent registry of the resource sharing platform in accordance with one or more embodiments.

FIG. 7 shows an example of an organization interface the client device 182 that enables the Organization A to search the talent registry 110 in accordance with one or more embodiments. The organization interface with a search button 724 selected enables the Organization A to enter search terms into input field 710 and select a target for the search using a pull-down menu 712. In this example, the Organization A has selected to search the talents, including the talents 112, stored in the talent registry 110. Other areas that can be searched can include conditions on the talents, including the conditions 114, talents tags, conditions tags, user profiles stored in the organization registry 110, etc.

Figure 8:
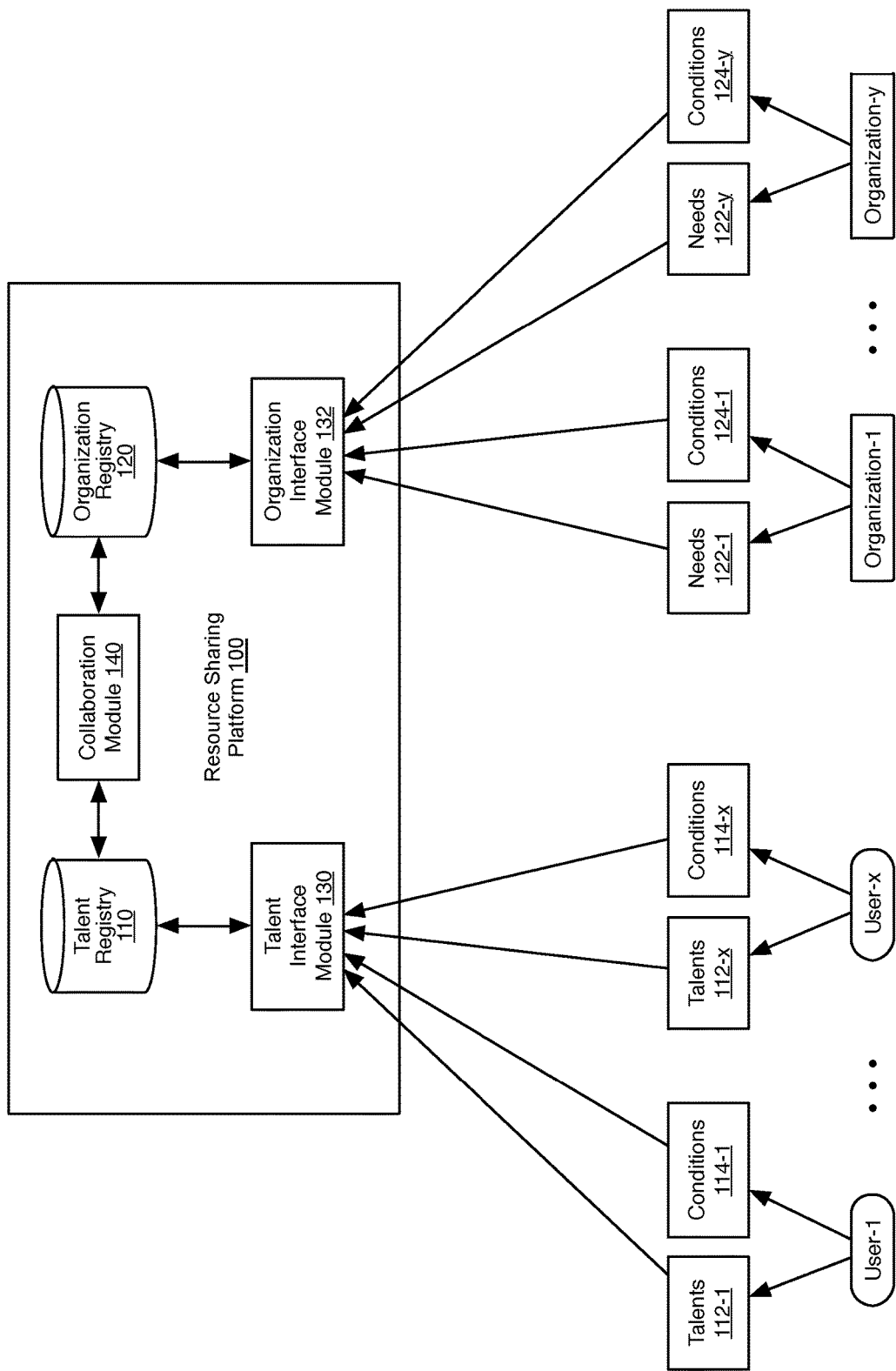
FIG. 8 shows how a wide variety of registered users and organizations of a resource sharing platform can use the resource sharing platform to advertise their talents, needs, and conditions and form potential resource sharing matches in accordance with one or more embodiments.

FIG. 8 shows a set of users, User-1 through User-x, who have registered user accounts on the resource sharing platform 100, and a set of organizations, Organization-1 through Organization-y having organization accounts on the resource sharing platform 100 in accordance with one or more embodiments. The users User-1 through User-x store their respective talents, the talents 112-1 through 112-x, and their respective conditions, the conditions 114-1 through 114-x, in the talent registry 110 on the resource sharing platform 100. The organizations Organization-1 through Organization-y store their respective needs, the needs 122-1 through 122-y, and their respective conditions, the conditions 124-1 through 124-y, in the organization registry 120 on the resource sharing platform 100.

The resource sharing platform 100 may enable the users User-1 through User-x to search for and discover the needs 122-1 through 122-y or the conditions 124-1 through 124-y. The resource sharing platform 100 may enable the organizations Organization-1 through Organization-y to search for and discover the talents 112-1 through 112-x and the conditions 114-1 through 114-x. The organizations Organization-1 through Organization-y can be a home organization, an away organization, or both, with respect to any of the users User-1 through User-x in a potential resource sharing match.

Various components of the resource sharing platform 100 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments, the resource sharing platform 100 is a platform for facilitating real-time interaction between one or more entities. For example, the messaging platform 100 may store millions of accounts of individuals, businesses, and/or other entities. One or more users of each account may use the resource sharing platform 100 to interact with accounts inside and/or outside of the resource sharing platform 100. The resource sharing platform 100 may be configured to enable users to communicate in "real-time", i.e., to converse with other users with a minimal delay and to conduct a conversation with one or more other users during concurrent sessions.

Although the components of the resource sharing platform 100 are depicted as being directly communicatively coupled to one another, this is not necessarily the case. For example, one or more of the components of the resource sharing platform 100 may be communicatively coupled via a distributed computing system, a cloud computing system, or a networked computer system communicating via the Internet.

Figure 9:
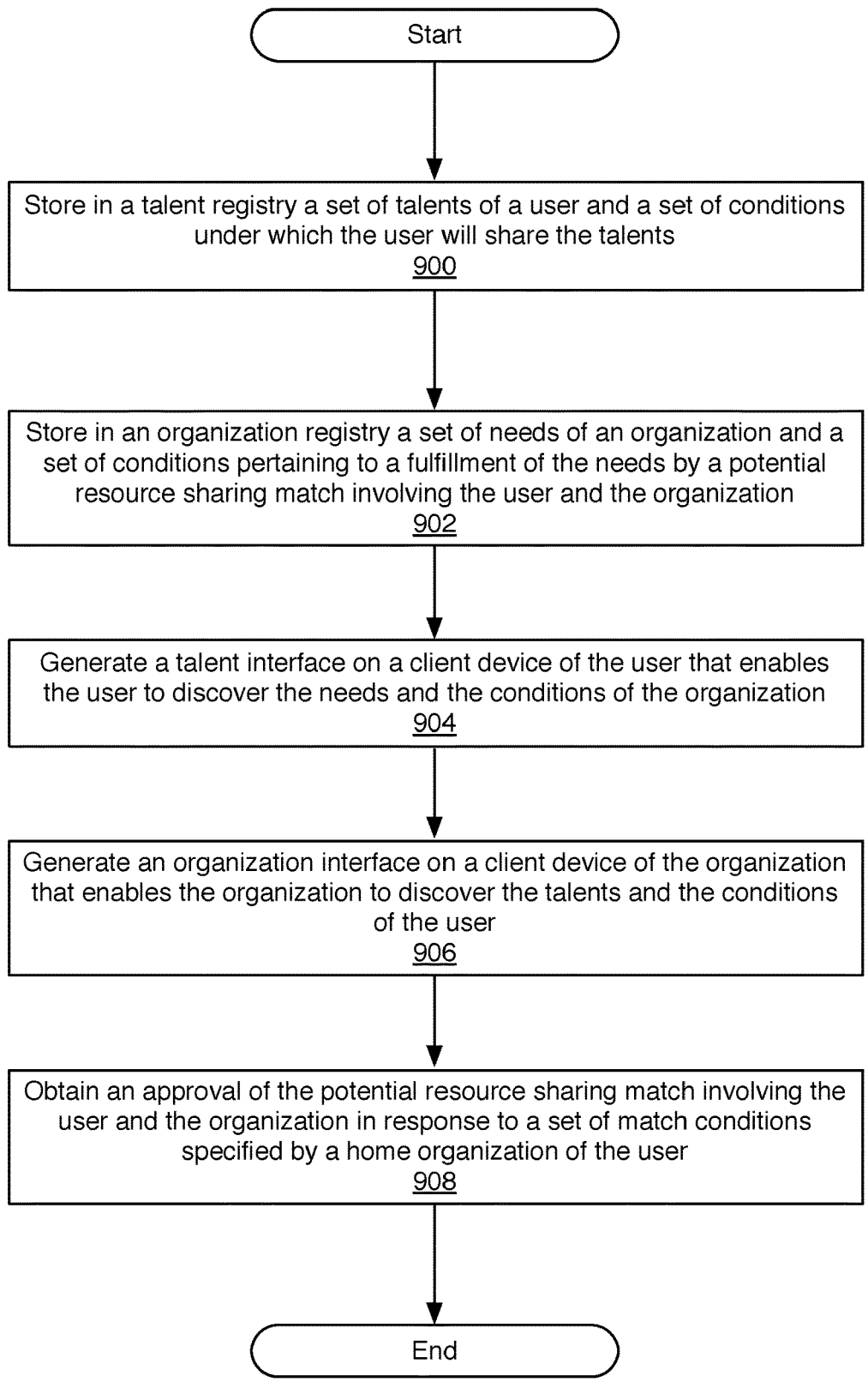
FIG. 9 shows a flowchart of a method for resource sharing in accordance with one or more embodiments.

FIG. 9 shows a flowchart of a method for resource sharing in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 9 should not be construed as limiting the scope of the invention.

In STEP 900, a set of talents of a user and a set of conditions under which the user will share the talents are stored in a talent registry. The talents and the conditions of the talents can be provided by the user and stored in a cloud-based talent registry using a client device of the cloud-based talent registry. The talents and the conditions of the talents can be stored, e.g., in a cloud-based database that provides the talent registry.

In STEP 902, a set of needs of an organization and a set of conditions pertaining to a fulfillment of the needs by a potential resource sharing match involving the user and the organization are stored in an organization registry. The needs and the conditions on the needs can be provided by a representative of the organization and stored in a cloud-based organization registry using a client device of the cloud-based organization registry.

In STEP 904, a talent interface is generated on a client device of the user that enables the user to discover the needs and the conditions of the organization. The talent interface can be generated with web protocols or using an app on the client device that is adapted for an operating system of the client device. The talent interface can enable the user to perform a search of the organization registry.

In STEP 906, an organization interface is generated on a client device of the organization that enables the organization to discover the talents and the conditions of the user. The organization interface can be generated with web protocols or using an app on the client device that is adapted for an operating system of the client device. The organization interface can enable a representative of the organization to perform a search of the talent registry.

In STEP 908, an approval is obtained of the potential resource sharing match involving the user and the organization in response to a set of match conditions specified by a home organization of the user. The approval can be obtained from a representative of the home organization of the user. The approval can be obtained via a messaging system, e.g., email, instant messaging, web interface, etc.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Figure 10:
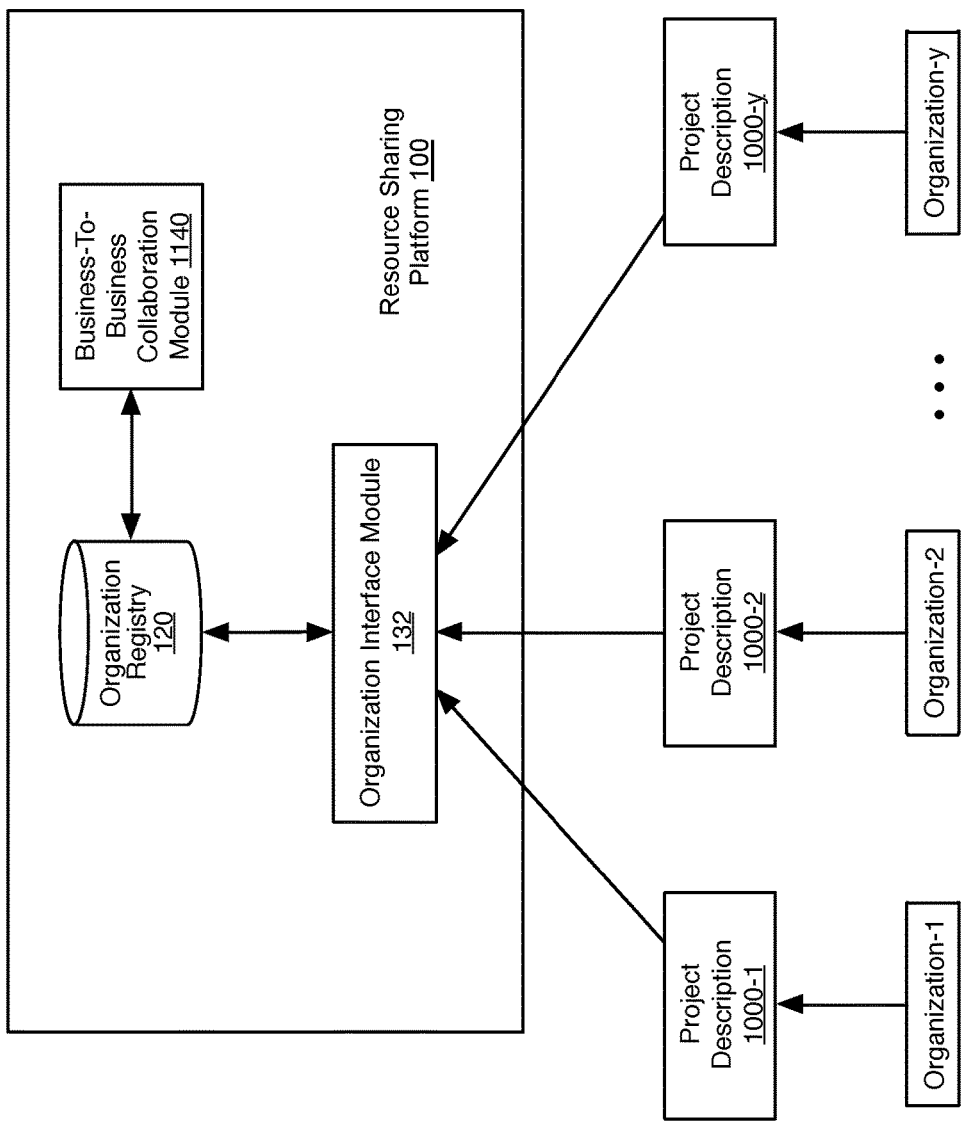
FIG. 10 shows an embodiment of a resource sharing platform that enables business-to-business collaboration.

FIG. 10 shows an embodiment of the resource sharing platform 100 that enables business-to-business collaboration among organizations having organization accounts on the resource sharing platform 100. Examples of business-to-business collaborations include joint innovation projects, joint product developments, and exclusive agreements to share resources. A business-to-business collaboration can involve any combination of organizations having organization accounts on the resource sharing platform 100.

For example, the resource sharing platform 100 enables each organization Organization-1 through Organization-y to store a respective project description 1000-1 through 1000-y in the organization registry 120. Each project description 1000-1 through 1000-y provides a description of a proposed business-to-business collaboration (e.g., a proposed joint innovation project, a proposed joint product development, a proposed exclusive agreement to share resources, or a collaboration involving any combination of innovation, product development, resource sharing, etc.). An organization registered with the resource sharing platform 100 can advertise any number of project descriptions in the organization registry 120.

The project descriptions 1000-1 through 1000-y can include any type or types of descriptors, parameters, tags, etc. For example, a project description stored in the organization registry 120 can include a text description of a proposed joint innovation project, a text description of a proposed joint product development, a text description of a proposed exclusive agreement to share resources, etc.

A project description stored in the organization registry 120 can include a description of resources offered or needed in a collaboration (e.g., human resources, expertise, data, foundry access, intellectual property rights, plant/equipment, natural resources, raw materials, computing resources, networking resources, or any other business resource that can be used in a business collaboration). A project description stored in the organization registry 120 can include a description of a quid pro quo of resource exchange or sharing (e.g., programming resources in exchange for marketing resources, access to manufacturing facilities in exchange for natural resources, sharing of media libraries, etc.).

A project description stored in the organization registry 120 can include a description of products, processes, expertise, capacities, etc., to be innovated or developed in a business-to-business collaboration. Products or processes can be improvements to existing products or processes or development of completely new products or processes.

A project description stored in the organization registry 120 can include a description of ownership, IP rights, etc., in the fruits of a business-to-business collaboration. Ownership, rights, etc., can be based on joint ownership, cross-licenses, shop rights, equity ownership in spinoffs, etc.

In one or more embodiments, the organization interface module 132 enables the organizations having organization accounts on the resource sharing platform 100 to search the organization registry 120 and discover the project descriptions 1000-1 through 1000-y stored in the organization registry 120. For example, the organization interface module 132 enables a representative, official, administrator, etc., of the organization-1 to search the organization registry 120 and discover the project descriptions 1000-2 through 1000-y (e.g., by generating a user interface on a client device that enables a search of the organization registry 120).

In one or more embodiments, the resource sharing platform 100 includes a business-to-business collaboration module 1140. The business-to-business collaboration module 1140 can enable communication among the organizations Organization-1 through Organization-y and enable formulation of business collaborations based on the project descriptions 1000-1 through 1000-y in the organization registry 120. The business-to-business collaboration module 1140 can facilitate negotiations for joint innovation projects, joint product development efforts, exclusive agreements to share resources, or any combination or form of business-to-business collaboration.

Figure 11:
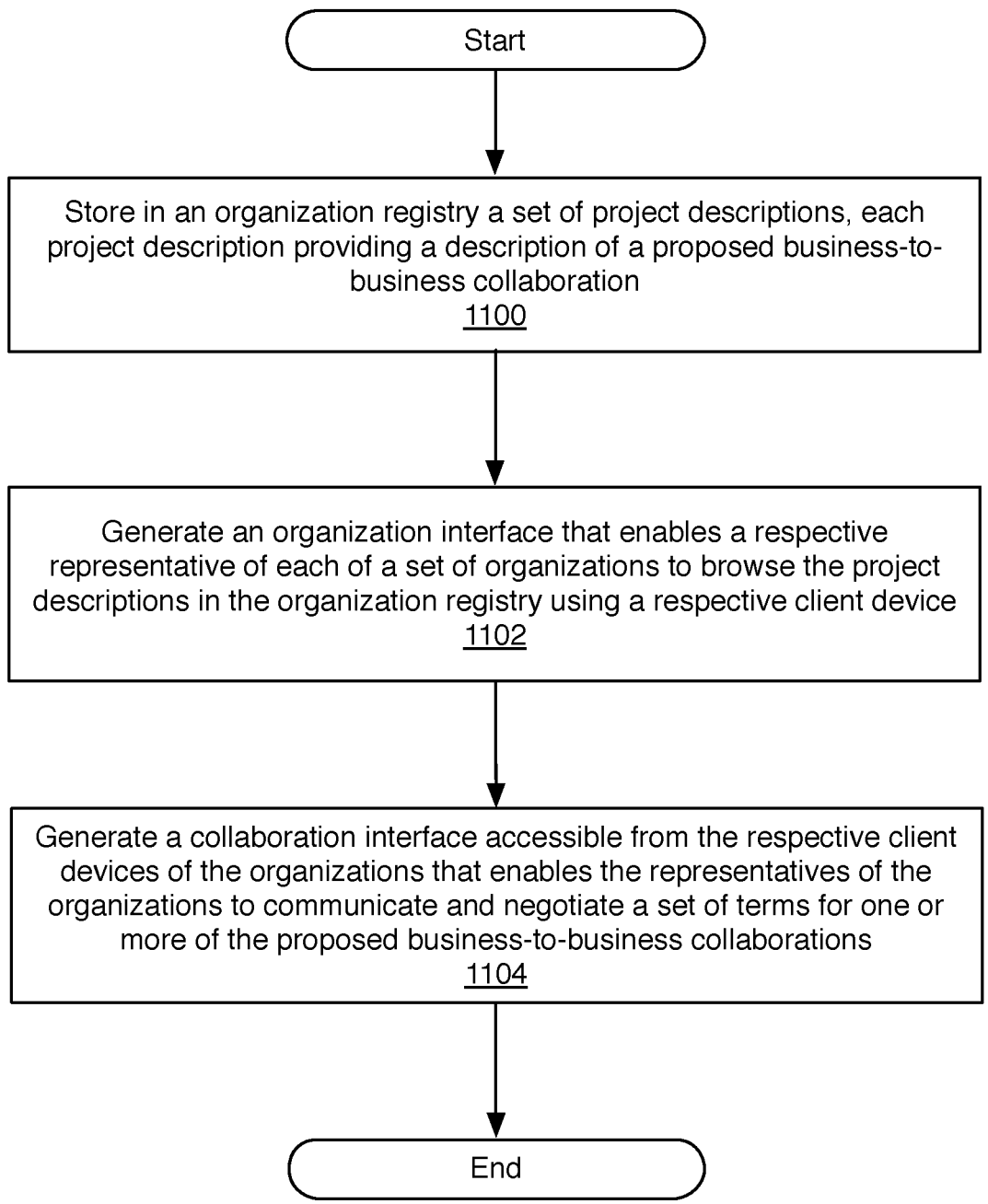
FIG. 11 shows a flowchart of a method for business-to-business collaboration in one or more embodiments.

FIG. 11 shows a flowchart of a method for business-to-business collaboration in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 11 should not be construed as limiting the scope of the invention.

In STEP 1100, a set of project descriptions are stored in an organization registry. Each project description provides a description of a proposed business-to-business collaboration. The project descriptions stored in the organization registry can be created by representatives of organizations having accounts on a resource sharing platform. An organization can have any number of project descriptions stored in the organization registry.

In STEP 1102, an organization interface is generated that enables a respective representative of each of a set of organizations to browse the project descriptions in the organization registry using a respective client device. For example, the organization interface can include user interface elements that enable the representatives of the organizations to search the organization registry using keywords, timing parameters, trending topics, names of organizations, etc.

In STEP 1104, a collaboration interface is generated accessible from the respective client devices of the organizations. The collaboration interface enables the representatives of the organizations to communicate and negotiate a set of terms for one or more of the proposed business-to-business collaborations described by the project descriptions stored in the organization registry. The collaboration interface can enable communications among representatives of the organizations via email, messaging, or a formal structured communication adapted to forming binding legal contracts among businesses.

The information stored in the talent registry 110 and the organization registry 120 and information pertaining to collaborations formed from the information stored in the talent registry 110 and the organization registry 120, including collaborations involving individuals, collaborations involving organizations, and collaborations involving a combination of individuals and organizations, can provide the basis of a set of data analytics. For example, the information stored in the talent registry 110 and the organization registry 120 and resulting collaborations can be used to determine trends (e.g., skills that are in demand, skills that are keen to be shared, hot areas of joint development, hot areas of research, etc.). The trends can be broken down by industry and tracked over time, by time of year, season, correlations to the stock market, fiscal and monetary policies, etc.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 12:
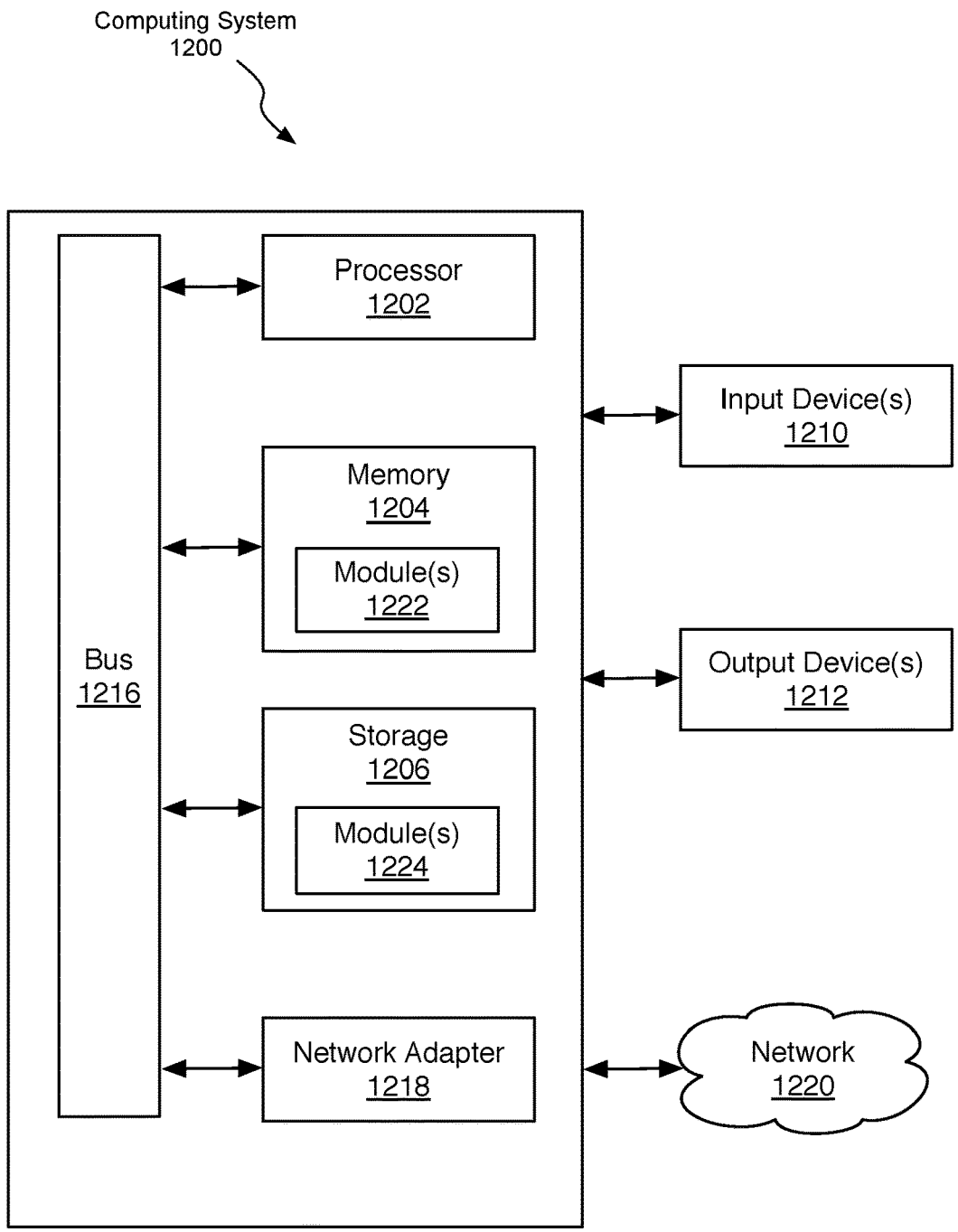
FIG. 12 shows a computing system on which portions of a resource sharing platform can be implemented in accordance with one or more embodiments.

For example, as shown in FIG. 12, a computing system 1200 may include one or more computer processor(s) 1202, associated memory 1204 (e.g., random access memory (RAM), cache memory, flash memory, etc.), one or more storage device(s) 1206 (e.g., a hard disk, an optical drive such as a compact disk (CD) drive or digital versatile disk (DVD) drive, a flash memory stick, etc.), a bus 1216, and numerous other elements and functionalities. The computer processor(s) 1202 may be an integrated circuit for processing instructions. For example, the computer processor(s) may be one or more cores or micro-cores of a processor.

In one or more embodiments, the computer processor(s) 1202 may be an integrated circuit for processing instructions. For example, the computer processor(s) 1202 may be one or more cores or micro-cores of a processor. The computer processor(s) 1202 can implement/execute software modules stored by computing system 1200, such as module(s) 1222 stored in memory 1204 or module(s) 1224 stored in storage 1206. For example, one or more of the modules described in FIG. 1 (e.g., the collaboration module 140) can be stored in memory 1204 or storage 1206, where they can be accessed and processed by the computer processor 1202. In one or more embodiments, the computer processor(s) 1202 can be a special-purpose processor where software instructions are incorporated into the actual processor design.

The computing system 1200 may also include one or more input device(s) 1210, such as a touchscreen, keyboard, mouse, microphone, touchpad, electronic pen, or any other type of input device. Further, the computing system 1200 may include one or more output device(s) 1212, such as a screen (e.g., a liquid crystal display (LCD), a plasma display, touchscreen, cathode ray tube (CRT) monitor, projector, or other display device), a printer, external storage, or any other output device. The computing system 1200 may be connected to a network 1220 (e.g., a local area network (LAN), a wide area network (WAN) such as the Internet, mobile network, or any other type of network) via a network interface connection 1218. The input and output device(s) may be locally or remotely connected (e.g., via the network 1220) to the computer processor(s) 1202, memory 1204, and storage device(s) 1206.

One or more elements of the aforementioned computing system 1200 may be located at a remote location and connected to the other elements over a network 1220. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1 and 8) may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1 and 8) and/or flowcharts (e.g., FIG. 9). Examples of non-transitory computer-readable media can include, but are not limited to, compact discs (CDs), flash memory, solid state drives, random access memory (RAM), read only memory (ROM), electrically erasable programmable ROM (EE-PROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A resource sharing platform, comprising:
    a computer processor;
    a talent registry for storing a set of talents of a user and a set of user conditions under which the user is willing to share the talents, wherein at least one of the user conditions is a type of career enhancement the user wishes to obtain;
    an organization registry for storing a set of needs of an away organization and a set of conditions pertaining to a fulfillment of the needs by a potential resource sharing match involving the user, the away organization, and a home organization, wherein the home organization is an employer of the user;
    a talent interface module executing on the computer processor and configured to enable the computer processor to generate a talent interface on a client device of the user, the talent interface enabling the user to specify the talents and the user conditions of the user and enabling the user to discover the needs and the organization conditions of the away organization;
    an organization interface module executing on the computer processor and configured to enable the computer processor to generate an organization interface on a client device of the organization, the organization interface enabling the organization to specify the needs and the conditions of the organization and enabling the organization to discover the talents and the conditions of the user; and
    a collaboration module executing on the computer processor and configured to enable the computer processor to obtain an approval from the home organization of the potential resource sharing match involving the user, the away organization, and the home organization in response to a set of match conditions for the resource sharing match specified by the home organization of the user, wherein the set of match conditions for the resource sharing match specified by the home organization of the user include the type of career enhancement the user wishes to obtain, and wherein the match conditions include a description of an organization enhancement the home organization seeks to acquire from the potential resource sharing match, and wherein the home organization is an organization the user is currently associated with, and wherein the away organization is another organization that the home organization allows the user to work at.

2. The resource sharing platform of claim 1, wherein the user conditions under which the user is willing to share the talents include a set of constraints pertaining to a participation by the user in the potential resource sharing match.

3. The resource sharing platform of claim 2, wherein the constraints include a time during which the user is available to participate in the potential resource sharing match.

4. The resource sharing platform of claim 1, wherein the user conditions under which the user is willing to share the talents include a description of a career enhancement the user seeks to acquire from the potential resource sharing match.

5. The resource sharing platform of claim 1, wherein the organization conditions pertaining to a fulfillment of the needs include a set of constraints pertaining to a participation by the away organization in the potential resource sharing match.

6. The resource sharing platform of claim 5, wherein the constraints include a time during which the away organization is available to participate in the potential resource sharing match.

7. The resource sharing platform of claim 1, wherein the organization conditions pertaining to a fulfillment of the needs include a description of an organization enhancement the away organization seeks to acquire from the potential resource sharing match.

8. The resource sharing platform of claim 1, wherein the match conditions include a set of constraints under which the home organization is willing to allow the user to participate in the potential resource sharing match.

9. The resource sharing platform of claim 8, wherein the constraints include a time during which the home organization is willing to allow the user to participate in the potential resource sharing match.

10. A method for sharing resources, comprising:
    storing, in a talent registry, a set of talents of a user and a set of user conditions under which the user will share the talents, wherein at least one of the user conditions is a type of career enhancement the user wishes to obtain;
    storing, in an organization registry, a set of needs of an away organization and a set of organization conditions pertaining to a fulfillment of the needs by a potential resource sharing match involving the user, the away organization, and a home organization, wherein the home organization is an employer of the user;
    generating a talent interface, on a client device of the user, that enables the user to discover the needs and the conditions of the away organization;
    generating an organization interface, on a client device of the organization, that enables the away organization to discover the talents and the conditions of the user; and
    obtaining an approval from the home organization of the potential resource sharing match involving the user, the away organization, and the home organization in response to a set of match conditions specified by the home organization of the user, wherein the set of match conditions specified by the home organization of the user include the type of career enhancement the user wishes to obtain, and wherein the match conditions include a description of an organization enhancement the home organization seeks to acquire from the potential resource sharing match, and wherein the home organization is an organization the user is currently associated with, and wherein the away organization is another organization that the home organization allows the user to work at.

11. The method of claim 10, wherein storing the user conditions under which the user is willing to share the talents includes obtaining a set of constraints pertaining to a participation by the user in the potential resource sharing match from the user via the client device of the user.

12. The method of claim 11, wherein obtaining a set of constraints includes obtaining a set of parameters that define a time during which the user is available to participate in the potential resource sharing match.

13. The method of claim 10, wherein storing the user conditions under which the user is willing to share the talents include storing a description of a career enhancement the user seeks to acquire from the potential resource sharing match.

14. The method of claim 10, wherein storing the organization conditions pertaining to a fulfillment of the needs includes obtaining a set of constraints pertaining to a participation by the organization in the potential resource sharing match from the organization via the client device of the organization.

15. The method of claim 14, wherein obtaining the constraints includes obtaining a set of parameters that define a time during which the organization is available to participate in the potential resource sharing match.

16. The method of claim 10, wherein storing the organization conditions pertaining to the fulfillment of the needs includes storing a description of an organization enhancement the organization seeks to acquire from the potential resource sharing match.

17. The method of claim 10, wherein the match conditions include a set of constraints under which the home organization is willing to allow the user to participate in the potential resource sharing match.

18. The method of claim 17, wherein the constraints include a time during which the home organization is willing to allow the user to participate in the potential resource sharing match.

19. A non-transitory computer-readable storage medium comprising a plurality of instructions configured to execute on at least one computer processor to enable the at least one computer processor to:

store, in a talent registry, a set of talents of a user and a set of user conditions under which the user will share the talents, wherein at least one of the user conditions is a type of career enhancement the user wishes to obtain;

store, in an organization registry, a set of needs of an away organization and a set of organization conditions pertaining to a fulfillment of the needs by a potential resource sharing match involving the user, the away organization, and a home organization, wherein the home organization is an employer of the user;

generate a talent interface, on a client device of the user, that enables the user to discover the needs and the conditions of the away organization;

generate an organization interface, on a client device of the organization, that enables the organization to discover the talents and the conditions of the user; and obtain an approval of the potential resource sharing match involving the user, the away organization, and the home organization in response to a set of match conditions specified by the home organization of the user, wherein the set of match conditions specified by the home organization of the user include the type of career enhancement the user wishes to obtain, and wherein the match conditions include a description of an organization enhancement the home organization seeks to acquire from the potential resource sharing match, and wherein the home organization is an organization the user is currently associated with, and wherein the away organization is another organization that the home organization allows the user to work at.

\* \* \* \* \*